United States Patent [19]

Govind

[11] Patent Number: 4,668,255
[45] Date of Patent: May 26, 1987

[54] ADSORPTION OF GASES BY AMINE COMPLEXED MN (II)

[75] Inventor: Rakesh Govind, Cincinnati, Ohio

[73] Assignee: University of Cincinnati, Cincinnati, Ohio

[21] Appl. No.: 792,972

[22] Filed: Oct. 30, 1985

[51] Int. Cl.$^4$ .............................................. B01D 53/14
[52] U.S. Cl. ........................................... 55/73; 55/68
[58] Field of Search ............... 55/68, 73; 423/210 S, 423/219, 230, 239, 240 S, 247

[56] References Cited

U.S. PATENT DOCUMENTS

| | | | |
|---|---|---|---|
| 2,450,276 | 9/1948 | Fogler et al. | 423/219 X |
| 2,523,549 | 9/1950 | Axe | 423/219 X |
| 2,811,221 | 10/1957 | Mangold et al. | 55/161 |
| 4,032,617 | 6/1977 | Gay | 423/219 |
| 4,081,509 | 3/1978 | Hishinuma et al. | 55/68 X |
| 4,091,073 | 5/1978 | Winkler | 55/68 X |
| 4,091,822 | 5/1978 | Ihrig et al. | 55/68 X |
| 4,198,792 | 4/1980 | Christensen et al. | 55/68 X |
| 4,251,452 | 2/1981 | McAuliffe et al. | 423/210 S X |
| 4,309,392 | 1/1982 | Shaw et al. | 423/239 |
| 4,323,543 | 4/1982 | McAuliffe et al. | 423/219 |
| 4,457,898 | 7/1984 | Hill et al. | 423/219 |
| 4,542,010 | 9/1985 | Roman et al. | 423/219 X |

FOREIGN PATENT DOCUMENTS

| | | | |
|---|---|---|---|
| 89183 | 9/1983 | European Pat. Off. | 423/219 |
| 0098157 | 1/1984 | European Pat. Off. | |
| 0098731 | 1/1984 | European Pat. Off. | |
| 204852 | 12/1983 | German Democratic Rep. | 423/219 |
| 54-147492 | 5/1974 | Japan | |
| 54-128975 | 3/1978 | Japan | |
| 1007709 | 3/1983 | U.S.S.R. | 423/219 |

OTHER PUBLICATIONS

N. I. Pirtskhalava, Yu. Ys. Kharitonov, M. V. Bregvadze, "Manganese (II) Complexes with Some Aromatic Amines", Zhumal Neorganicheskoi Khimi, 20, 1852–1856, (1975).

Michael Barber et al, "Absorption/Desorption of Labelled Dioxygen by the Haem Analogues, Mn(PR$_3$)X$_2$", Inorganica Chimica Acta, 45, (1980), L89–L90.

C. A. McAuliffe et al, "E.S.R. Studies of Some Working Haem Analogues Mn(PR3)X2 and Their Dioxygen Adducts", J. Chem. Soc., Chem. Commun., 1982, pp. 68–70.

R. D. Jones et al, "Synthetic Oxygen Carriers Related to Biological Systems", Chemical Reviews, 1979, vol. 79, No. 2, pp. 139–179.

Primary Examiner—Robert Spitzer
Attorney, Agent, or Firm—Wood, Herron & Evans

[57] ABSTRACT

Amine complexed Mn(II) compounds reversibly adsorb sulfur dioxide and oxygen as well as nitrogen oxides, carbon monoxide, carbon dioxide and lower alkenes. More specifically, these compounds have the following formula:

$$Mn(II)LX_2$$

where X represents F$^-$, Br$^-$, I$^-$, SCN$^-$ or OH$^-$. L is a ligand having the formula $$N(R_1)_n \text{ or } R_2-N=N-R_3$$

wherein $R_1$, $R_2$ and $R_3$ represents identical or different substituents generally including alkyl, aryl, cycloalkyl, heterocyclic and heterocyclic aromatic radicals and n is 1–3. The metal complexes are used to adsorb gases as a solid adsorbent, suspended on aluminum oxide or dissolved in a non-volatile solvent. The gas can be adsorbed at a low temperature in the range of 30°–200° C., and desorbed at a higher temperature in the range of 45°–230° C. or at a lower pressure.

27 Claims, No Drawings

ADSORPTION OF GASES BY AMINE COMPLEXED MN (II)

BACKGROUND OF THE INVENTION

The adsorption of selected gases from a fluid stream provides a useful method of removing impurities from the fluid stream where the selected gases are impurities and a means to collect desired gases where the selected gas is useful in other processes. In one particular example, the selective adsorption of a gas from a fluid stream can be used to remove sulfur dioxide from an effluent gas stream such as the tower emissions from a coal-burning power plant. Selective adsorption can also be used to collect oxygen, lower alkenes, carbon monoxide, nitrogen oxides and other gases.

To be of any worthwhile economic value, it is highly critical that the adsorption be reversible, requiring minimal energy input. Compounds are known which reversibly adsorb gases from a fluid stream. For example, Cobalt (II), known as the Salen chelate and Fluomine chelate complexes of the Vaska type takeup oxygen reversibly. The adducts do not, under moderate conditions, release oxygen to regenerate the sorbent complex sufficiently readily to enable oxygen to be produced or nitrogen to be purified on a commercial scale.

McAuliffe et al U.S. Pat. No. 4,251,452 and continuation 4,323,543 disclose the use of manganese (II) complexes to reversibly adsorb oxygen, sulfur dioxide, hydrogen and ethylene. The manganese compounds disclosed have the following formula:

$$Mn(II)LX_2$$

wherein L represents a mono-dentate ligand having the formula:

in which formula $R_1$, $R_2$ and $R_3$, which may be identical or different, represent substituted or unsubstituted alkyls, cycloalkyl or aryl groups or hydrogen, and X is a species capable of existing as an anion representing $Cl^-$, $Br^-$, $I^-$, $CN^-$, $NO^-_2$, $NO^-_3$, $OH^-$, $NCS^-$ or $NCO^-$. Because of the reactivity of the ligand towards water, it is necessary in the preparation and use of these manganese (II) complexes to maintain anhydrous conditions. The complexes react quickly with water and are irreversibly inactivated. For this reason, these compounds are totally useless in an ambient environment or under the rigorous conditions of a flue stack where high concentrations of moisture vapors may be encountered.

Many different manganese compounds have been reported. Various compounds formed from hydrated manganese and various nitrogen containing ligands are known. For example, in Vol. 35 of *The Journal of the Indian Chemistry* No. 10,1958 several different compounds formed from manganese chloride and ammonia are disclosed. The compounds formed and discussed in this article are formed in an alcohol solution which prevents formation of Mn(II) compounds. In *Zhurnal Neorganicheskoi Khimii*, 20, 1852–1856 (1975) there is disclosed compounds of manganese (II) thiocyanate reacted with aniline or a toluidine. Since the manganese compound is not anhydrous, the formed compound was not a Mn(II) compound.

The *Jour. and Proc. Inst. Chem.* Vol. 37, November, 1965 reports compounds formed from manganese chloride (dehydrated) and dilute solutions of amines in an alcohol solvent. The compounds are formed in dry air. Oxygen present during the formation prevents formation of an Mn(II) compound. These references do not teach any method of adsorbing gas. Further none of these reported compounds adsorb oxygen or any other gases.

SUMMARY OF THE INVENTION

The present invention is premised upon the realization that a manganese (II) complex having the following general formula:

$$Mn(II)LX_2$$

wherein L represents a ligand which includes a nitrogen atom which can complex with the Mn(II) atom and which is sensitive to oxygen, nitrogen oxides, sulphur dioxide, carbon dioxide, carbon monoxide or lower alkenes will reversibly adsorb oxygen, sulfur dioxide, nitrogen oxides, carbon monoxide, carbon dioxide, lower alkenes or other gases. Further this compound is not water sensitive.

These compounds are less expensive than compounds having a phosphorous-based ligand. In comparison to the compounds disclosed in McAuliffe et al, the compounds of the present invention adsorb more gas and act at a faster rate.

The above compounds must be formed by reacting an anhydrous manganese II compound such as a manganese halide with the gas sensitive ligand in an appropriate inert solvent free of water and alcohol. The reaction must be conducted in an inert environment. The formed product is capable of adsorbing and desorbing gases at relatively low temperatures and pressures and is not moisture sensitive.

These advantages as well as others will be appreciated in light of the following detailed description.

DETAILED DESCRIPTION

The manganese complexes used in the present invention are amino-complexed manganese (II) salts. The general formula of these compounds is:

$$Mn(II)LX_2$$

wherein L represents gas sensitive ligand, i.e., which is reactive with oxygen, nitrogen oxides, sulfur dioxide, carbon monoxide, carbon dioxide or lower alkenes at about 200° C. or less and which is represented by either of the following general formulas:

$$N(R_1)_n \text{ or } R_2—N=N—R_3$$

wherein $R_1$ generally represents one or more substituted or unsubstituted alkyl, cycloalkyl, aryl, arylaklyl or hydrogen group or a combination of the above and n represents an integer equal to 1–3. $R_2$ or $R_3$ also represents the same or different radicals including substituted and unsubstituted alkyl, cycloalkyl, aryl, arylaklyl or hydrogen. Alkyl also includes alkenyl and alkylene radicals. These radicals may be substituted with halogens, amines, alkoxy and ketone or aldehydes containing moieties but should not be substituted with oxidizing moieties such as esters, alcohols and carboxylic acid containing radicals.

X is an anion or counter ion preferably representing $Cl^-$, $Br^-$, $I^-$, $SCN^-$ or $OH^-$. Larger anions and anions which form strong close bonds with Mn(II), such as, for example, $F^-$, do not function as well as the preferred species. This is perhaps due to steric hindrance.

More specifically, L can represent a variety of nitrogen containing ligands varying from $NH_3$ and including such compounds as methyl amine, dimethyl amine, trimethyl amine, ethyl amine, diethyl amine, triethyl amine, N-propylamine, di-N-propylamine, tri-N-propylamine, isopropylamine, N-butyl amine, isobutyl amine, sec-butyl amine, tert-butyl amine, benzyl amine, phenyl ethylamine, ethylene diamine, 2-(N-methylamino) heptane, N-methyl-N-ethylene aniline, dipthalamine, aniline, methyl aniline, diphenyl amine, triphenyl amine, aminobenzoic acid, 1,2-diamino cyclohexane, diethylene triamine, tetramethyl cyclohexane-1,-2, diamine, 1,4,7,10-tetraazadecane, N,N-di-n-hexylethylenediamine, N-(α-methylbenzilidene) methylamine, o-toluidine, p-toluidine, N-phenylbenzylamine, p-phenetidine, quinoline, quinoxaline, phenylhydrazine, dibenzylamine, N,N-dimethyl-m-toluidine, N,N-dimethyl-p-toluidine, 5-aminoquinoline, 6-aminoquinoline HCl, m-anisidine, p-anisidine, benzylamine, dibenzylamine, N-ethylaniline, 8-hydroxyquinoline, 1-napthylamine, α-(1-napthyl)ethylamine, p-aminodiphenylamine, o-phenylene diamine, m-phenylene diamine, p-phenylenediamine, 2,3-dimethylaniline, N,N-diethyaniline, tribenzylamine, piperazine, 2-(2-diethylaminoethyl) pyridine, di-n-butylamine, benzidine, 2,4-diaminodiphenylamine, tetaethylene pentamine, N-phenyl benzylamine, 2,4-diaminodiphenyl amine, o-dianisidine, N-butyfluorocarbon, as well as others. Higher molecular weight amines are preferred because they are more stable and decompose or evaporate at higher temperatures. Compounds formed from 1,4,7,10-tetraazadecane and tetraethylene pentamine demonstrate a superior rate of oxygen uptake.

The compounds of the present invention are prepared by treating an appropriate manganese (II) compound ($MnX_2$) with the ligand L preferably in a solvent.

It is extremely important that the manganese compound be anhydrous to enable formation of an Mn(II) compound. For use in the present invention, the manganese compound is preferably dried at 60°–70° C. for 8–12 hours by passing hot dry nitrogen over the manganese compound. The manganese compound will generally have the formula $Mn(II)X_2$ wherein $X_2$ represents counter ions. Generally X will represent $Br^-$, $F^-$, $Cl^-$, $I^-$, $SCN^-$ or $OH^-$ and preferably $Br^-$, $Cl^-$ or $SCN^-$.

The compound for use in the present invention is formed by contacting the ligand L with the anhydrous manganese compound in an appropriate solvent at room temperature under dry nitrogen conditions or other inert conditions. The ligand as stated above can be selected from a wide variety of nitrogen containing compounds and generally should be selected from nitrogen containing compounds which are sensitive to oxygen, nitrogen oxides, sulfur dioxide, carbon monoxide, carbon dioxide or lower alkenes, in other words compounds which react with any of these gases in the temperature range of less than 230° C. Preferably the ligand is one which reacts with oxygen, i.e., is oxygen sensitive at temperatures less than 100° C. and preferably less than 30° C. The ligand must also be an anhydrous ligand or dehydrated and can be purchased in this form.

The solvent can be any inert organic solvent which can dissolve both the manganese compound $MnX_2$ and the ligand. Further the solvent must be dry and alcohol free. Alcohols are unsuitable for use as solvents in the present invention since they will react with the $MnX_2$ compound and prevent the formation of the compound of the present invention. Suitable solvents include tetrahydrofuran (THF) or toluene which have been dried by refluxing with sodium for 8–12 hours.

The reaction is conducted by combining the ligand with the $MnX_2$ compound in solution under a blanket of nitrogen. Generally 15–20 milliliters of solvent per gram of $MnX_2$ compound will be employed. A slight molar excess of ligand up to about 10% relative to the manganese present is used in the present reaction. A greater excess of ligand interferes with the formation of the final solid compound in that it has to be removed to obtain a functional compound.

The reaction is conducted at room temperature by mixing the $MnX_2$ compound with the ligand and solvent under dry nitrogen. This forms a solution which is mixed for 20–40 minutes and allowed to sit for about 2 hours. A precipitate should immediately form. This precipitate is usually not the compound of the present invention. The formed precipitate is filtered off under nitrogen. The solvent in the resulting solution is then removed by evaporation under vacuum at room temperature. A solid compound will remain. This is the compound of the present invention having the formula $Mn(II)LX_2$.

In certain cases, the formed product $Mn(II)LX_2$ is insoluble in the selected solvent and itself precipitates out. Under these circumstances, no other precipitate is formed and the product, i.e., the precipitate, can be recovered by filtration and drying. For example, $MnBr_2$ compounds which are insoluble in THF include compounds formed with the following ligands: tetramethyl cyclohexane-1,2,diamine,1,4,7,10 tetraazadecane, N,N di-n-hexylethylenediamine, N-(α-methylbenzyilidene) methylamine, p-phenetidine, quinoline, N,N-dimethyltoluidene, 7-aminoquinoline.HCl, anisidine, benzylamine, dibenzylamine, tribenzylamine, 1-naphthylamine, phenylene diamine, piperazine, 2-(2-diethylaminoethyl) pyridine, N-phenyl benzylamine, and 2,4 diaminodiphenylamine. Spectrographic analysis of the precipitate provides a means to determine if the $Mn(II)LX_2$ compound remains in solution or precipitates from solution.

In an alternate embodiment the compound $Mn(II)LX_2$ can be formed by depositing the composition on a solid support preferably porous aluminum oxide (AlO) beads. In this embodiment dried aluminum oxide beads are added to the solution of ligand and $Mn(II)LX_2$ after the initial precipitate has been filtered off. The solvent is removed by evaporation causing the aluminum oxide beads to be coated with the formed $Mn(II)LX_2$ compound. In this operation the upper and lowermost level of the aluminum oxide beads are discarded or marked because they generally have surface deposition of the complex.

The complex of the present invention can be used to selectively adsorb gases from a fluid stream by simply contacting the fluid stream with the $Mn(II)LX_2$ complex at effective temperatures and pressures. Gases which can be selectively adsorbed include oxygen, sulphur dioxide, nitrogen oxides, carbon monoxide, carbon dioxide and lower ($C_2$–$C_5$) alkenes. The gases are selectively adsorbed by contacting the mixture of gases with the manganese complex at a selected temperature and pressure. By controlling the temperature and pressure any one of these gases can be selectively adsorbed and desorbed from the manganese complex to provide a means to effectively separate selected gases from a stream of gas.

The temperature at which the adsorption will occur will range generally from about 30° C. to about 220° C. at about 1 atmosphere. The adsorption is reversed by increasing the temperature generally to 10° to 15° C. above the temperature at which the gas was adsorbed.

The adsorption can be further increased by increasing the pressure. Generally adsorption can occur at 1 atmosphere or higher and desorption can occur at less than 1 atmosphere down to a total vacuum.

With respect to the adsorption of oxygen, the most efficient adsorption temperature is from about 30° C. to about 50° C. at about 50 to about 75 psi. However, some compounds can adsorb oxygen at much lower temperatures such as $-10°$ C. The amount of oxygen adsorbed will depend on the adsorption temperature and pressure and particular compound used. At room temperature and pressure the amount of oxygen adsorbed will generally equal from about 0.5% to about 8% of the weight of the manganese complex. Maximum uptake is one mole of gas per mole of complex.

Sulphur dioxide is preferably adsorbed at substantially higher temperatures. For some compounds sulphur dioxide adsorption at atmospheric pressure is maximized at temperatures from about 200° C. to about 220° C. These are the typical stack temperatures encountered in a coal burning power plant. At atmospheric pressure desorption occurs at about 230° C. Sulphur dioxide adsorption can occur at lower temperatures but preferential adsorption of $SO_2$ in a mixed fluid stream generally requires higher temperatures.

When adsorption and desorption of $SO_2$ and other gases is conducted at these higher temperatures, the $Mn(II)LX_2$ compound must be one which is stable at these higher temperatures. More specifically the compound must be one wherein the ligand L as well as the $MnX_2$ salt are stable at these temperatures. $MnCl_2$ is preferred. Nitrogen containing ligands which are stable at 230° C. are known and include 1-napthylamine, and quinoxaline. These ligands are particularly suitable because they are sensitive (i.e., react) with $SO_2$ at 200° C.-230° C.

At atmospheric pressure nitrogen oxides, carbon monoxide, carbon dioxide and lower alkenes are adsorbed at temperatures generally between 0° C. and 200° C. again with desorption at about 15° C. above the adsorption temperature. This again will vary depending on the compound used. Generally for any particular compound the minimum gas adsorption temperature will be lowest for oxygen, highest for sulfur dioxide adsorption. The minimum adsorption temperatures for nitrogen oxides, carbon monoxide, carbon dioxide and the alkenes will be above the minimum adsorption temperature for oxygen and below the minimum adsorption temperature for sulfur dioxide.

The adsorption and desorption temperature not only varies with respect to the gas being adsorbed but also with respect to the particular $Mn(II)LX_2$ complex formed. When the complex is coated onto the aluminum oxide beads adsorption is substantially improved however the temperature of adsorption remains about the same.

The manganese complex of the present invention facilitates a wide variety of gas separations. For example, the complex can simply be used as a solid complex and contacted with the gas to be adsorbed at the effective temperatures and pressures. Alternately it can be dissolved in an appropriate solvent and adsorb gas by bubbling the gas through or over the solvent.

Adsorption and desorption of gas can also be conducted by simply varying the pressure and not actively changing the temperature with high pressure promoting adsorption and low pressure promoting desorption.

The present invention will be further appreciated by reference to the following examples in which a manganese (II) amino complex was contacted with a fluid stream having a defined oxygen or sulphur dioxide content, the oxygen or sulphur dioxide uptakes were measured.

EXAMPLE 1

Solid $Mn[N(CH_3)_3]Br_2$ was placed in the pan of a thermogravametric analyser (TGA) which was flushed with nitrogen. Dry air was introduced and maintained at 25° C. for a few minutes. Oxygen was taken up by the compound in an amount equal to 0.187 mg $O_2$ per gram of compound.

EXAMPLE 2

Solid $Mn[N(i-C_3H_7)_3](SCN)_2$ was placed in the pan of a TGA which was flushed first with nitrogen. Dry air was introduced and the temperature of maintained at 50° C. Over a period of a few minutes, 0.389 mg of oxygen were taken up per gram of compound. The oxygen was desorbed at a temperature of 120° C.

Solid $Mn[N(i-C_3H_7)_3](SCN)_2$ was placed in a beaker which was flushed first with nitrogen and then sulfur dioxide and sealed. Over a period of a few minutes at 50° C., 0.474 mg $SO_2$ was adsorbed per gram of Mn(II) complex. The $SO_2$ was desorbed at 120° C.

EXAMPLE 3

Mn $[N(C_2H_5)_3]Br_2$ was placed in the pan of a TGA which was flushed with nitrogen. Dry air was then introduced and the temperature maintained at 50° C. The total oxygen uptake was 0.270 mg of oxygen per gram Mn(II) complex.

Mn $[N(C_2H_5)_3]Br_2$ was placed in a beaker which was flushed with nitrogen and then $SO_2$ and sealed. After a few minutes at 50° C., 0.123 mg of $SO_2$ was adsorbed per gram of Mn(II) complex. Sulfur dioxide was desorbed at 120° C.

EXAMPLE 4

$Mn[C_{10}H_7NH_2]Cl_2$ (formed from $MnCl_2$ and napthylamine) coated on inert ceramic beads was placed in a beaker. The beaker was flushed with nitrogen and then sulfur dioxide and sealed. The temperature of adsorption was 200° C. After about five minutes the pressure stabilized and about 0.18 mg of $SO_2$ was adsorbed per gram of complex.

EXAMPLE 5

$Mn[NH_2(CH_2CH_2NH)_3CH_2CH_2NH_2]Br_2$ was placed on the pan of a TGA which was flushed with nitrogen. Dry air was then passed over the pan and the temperature was maintained at 36° C. After a few minutes 0.079 mg of oxygen was taken up per gram of Mn(II) complex.

The complex of the present invention is useful in a variety of applications where oxygen, sulfur dioxide, nitrogen oxides, carbon monoxide, carbon dioxide or a lower alkene must be separated from a fluid. Since the compound is not sensitive to moisture, the complex can be used in ambient conditions without concern for deactivating the complex.

Having thus described my invention, I claim:

1. A method of sorbing a gas comprising contacting a manganese (II) complex with said gas at an effective temperature and pressure;

said manganese (II) compound having the following general formula:

$$MnLX_2$$

wherein L represents a neutral nitrogen containing ligand which is sensitive to a compound selected from the group consisting of oxygen, nitrogen oxides, carbon monoxide, carbon dioxide, sulfur dioxide and $C_2$–$C_5$ alkenes and X represents an anion.

2. The method claimed in claim 1 wherein L represents a ligand represented by one of the following general formulas:

$$N(R_1)_n \text{ and } R_2-N=N-R_3$$

wherein $R_1$, $R_2$ and $R_3$ represents the same or different radicals selected from the group consisting essentially of substituted or unsubstituted alkyl, cycloalkyl, aryl, arylalkyl or hydrogen;

n represents an integer from 1–3.

3. The method claimed in claim 2 wherein said gas is selected from the group consisting of oxygen, nitrogen oxides, sulfur dioxide, carbon monoxide, carbon dioxide, and $C_2$–$C_5$ alkenes.

4. The method claimed in claim 2 wherein X represents a radical selected from the group consisting of $F^-$, $Cl^-$, $Br^-$, $I^-$, $SCN^-$ and $OH^-$.

5. The method claimed in claim 2 wherein $R_1$, $R_2$ and $R_3$ each represent a radical selected from the group consisting of $C_1$–$C_3$ alkyl and hydrogen.

6. The method claimed in claim 3 wherein said gas is contained in a fluid and said fluid is contacted with said manganese complex at a temperature from about $-10°$ C. to about $220°$ C. at atmospheric pressure.

7. The method claimed in claim 2 further comprising desorbing said gas from said compound by subjecting said compound to an effective temperature and pressure to effect desorbtion of said gas.

8. The method claimed in claim 2 further comprising stripping said gas sorbed by said compound by subjecting said compound to subatmospheric pressure.

9. The method claimed in claim 2 wherein said gas is sulfur dioxide.

10. The method claimed in claim 2 wherein said gas is oxygen.

11. The method claimed in claim 1 wherein said Manganese(II) complex is deposited on a solid support.

12. The method claimed in claim 11 wherein said solid support comprises aluminum oxide.

13. A compound having the following general formula:

$$Mn(II)LX_2$$

wherein L represents nitrogen containing ligand which is sensitive to a compound selected from the group consisting of oxygen, nitrogen oxides, sulfur dioxide, carbon monoxide, carbon dioxides, and $C_2$–$C_5$ alkenes and x represents an anion.

14. The compound claimed in claim 13 wherein L represents a ligand having one of the following general formulas:

$$N(R_1)_n \text{ and } R_2-N=N-R_3$$

wherein $R_1$, $R_2$ and $R_3$ represent the same or different radicals selected from the group consisting essentially of substituted or unsubstituted alkyl, cycloalkyl, aryl, arylalkyl or hydrogen;

n represents an integer equal to 1–3.

15. A compound as claimed in claim 13 wherein X represents a radical selected from the group consisting of $F^-$, $Cl^-$, $Br^-$, $I^-$, $SCN^-$ and $OH^-$.

16. A compound as claimed in claim 13 wherein $R_1$, $R_2$ and $R_3$ independently represent $C_1$–$C_3$ alkyl or hydrogen.

17. The compound claimed in claim 14 wherein X represents an anion selected from the group consisting of $SCN^-$, $Cl^-$ and $Br^-$ and L represents a ligand selected from the group consisting of 1,4,7,10-tetraazadecane and tetraethylene pentamine.

18. The compound claimed in claim 15 deposited on a solid support.

19. The compound claimed in claim 18 wherein said solid support is aluminum oxide.

20. A compound formed by reacting anhydrous $Mn(II)X_2$ with an anhydrous ligand in an inert atmosphere wherein said ligand is an oxygen sensitive nitrogen containing ligand wherein x represents an anion.

21. The compound claimed in claim 20 wherein said ligand has one of the following general formulas:

$$N(R_1)_n \text{ and } R_2-N=N-R_3$$

wherein $R_1$, $R_2$ and $R_3$ represent substituted or unsubstituted alkyl, cycloalkyl, aryl, arylalkyl or hydrogen;

n represents an integer equal to 1–3.

22. The compound claimed in claim 21 wherein X represents an anion selected from the group consisting of $SCN^-$, $Cl^-$ and $Br^-$.

23. The compound claimed in claim 20 deposited onto aluminum oxide beads.

24. A compound formed by reacting anhydrous $Mn(II)X_2$ with an anhydrous ligand in an inert atmosphere wherein said ligand is a sulfur dioxide sensitive nitrogen containing ligand wherein x represents an anion.

25. The compound claimed in claim 24 wherein said ligand has one of the following general formulas:

$$N(R_1)_n \text{ and } R_2-N=N-R_3$$

wherein $R_1$, $R_2$ and $R_3$ represent substituted or unsubstituted alkyl, cycloalkyl, aryl, arylalkyl or hydrogen;

n represents an integer equal to 1–3.

26. The compound claimed in claim 25 wherein X represents $Cl^-$ and L represents a ligand selected from the group consisting of 1-naphthylamine and N,N,-di-n-hexylethylene amine.

27. The compound claimed in claim 24 deposited onto aluminum oxide beads.

* * * * *